Aug. 15, 1944.    J. A. HAASE    2,355,645
BALE FORMER
Filed July 31, 1941    2 Sheets-Sheet 2
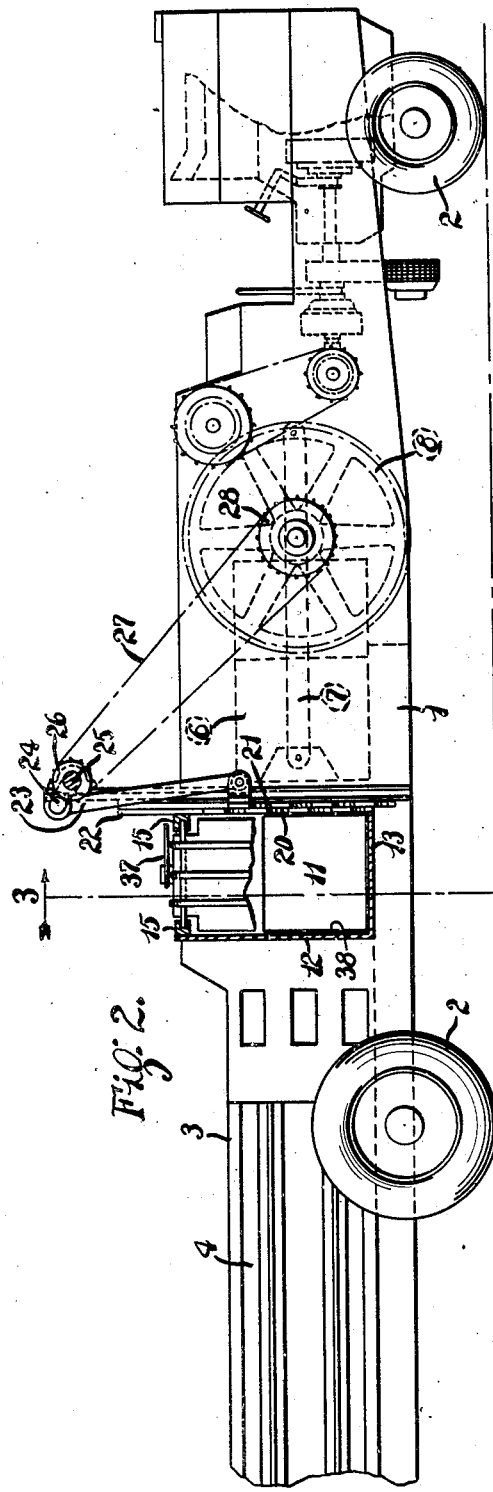
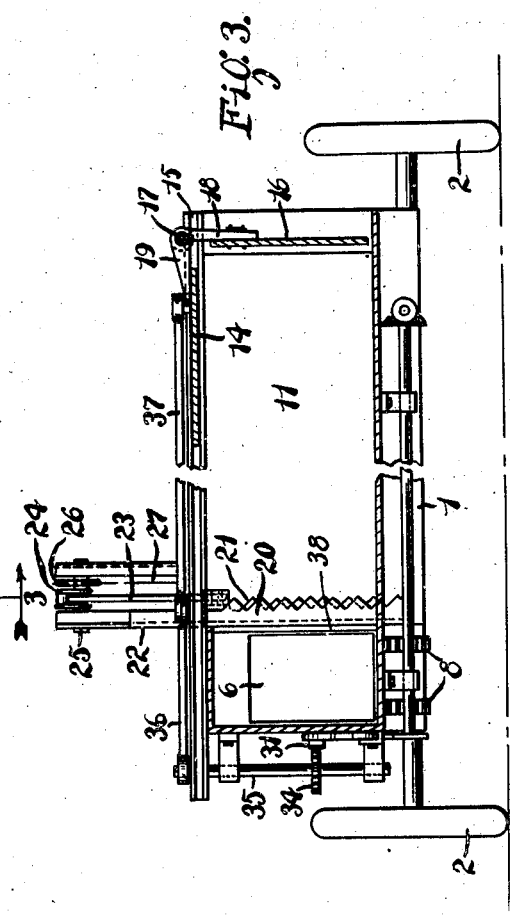
INVENTOR.
Jesse A. Haase,
BY Hood & Hahn
ATTORNEYS Patented Aug. 15, 1944

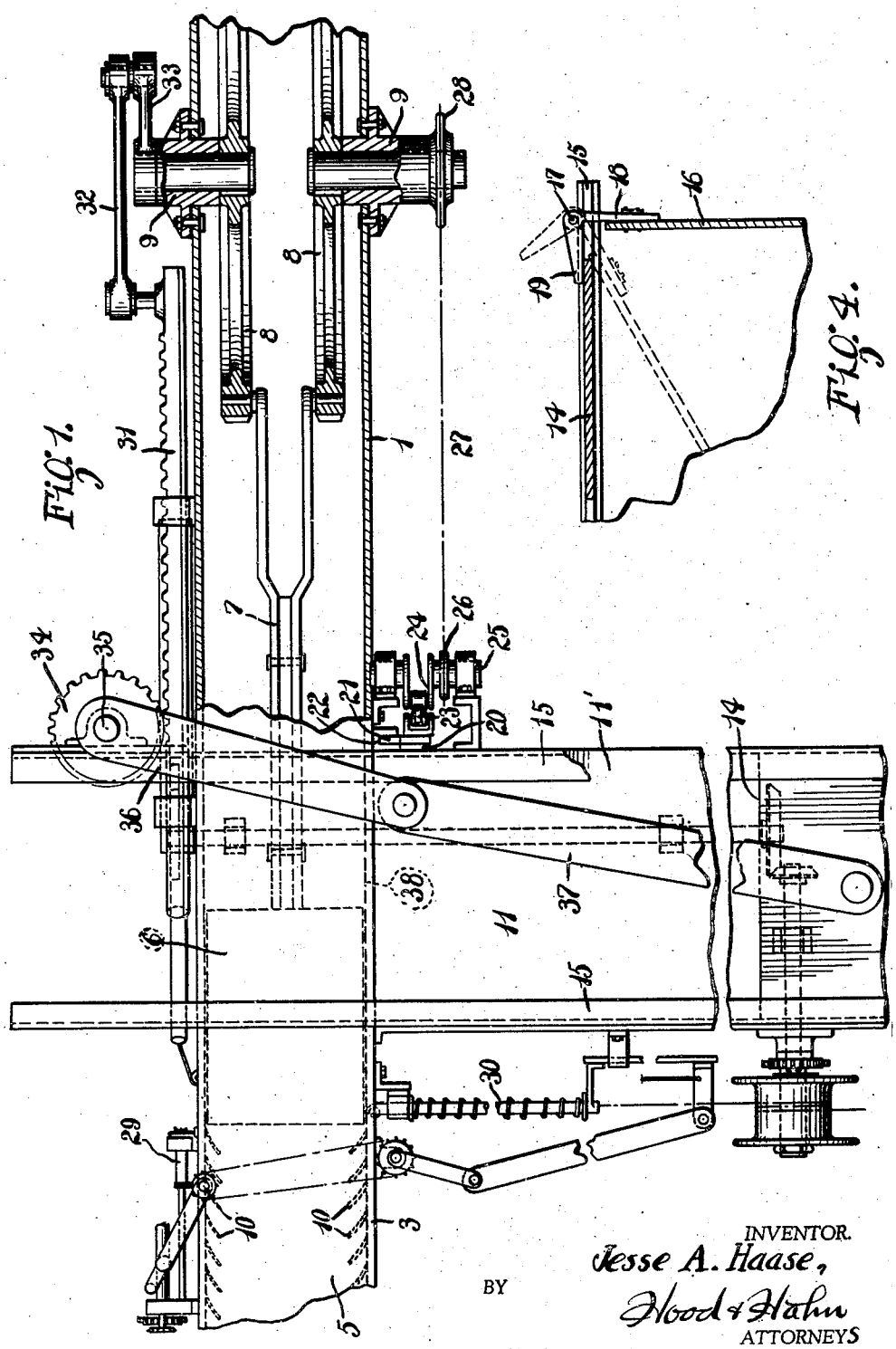

2,355,645

UNITED STATES PATENT OFFICE 2,355,645

BALE FORMER

Jesse A. Haase, Martinsville, Ind.

Application July 31, 1941, Serial No. 404,881

11 Claims. (Cl. 100—25)

My invention relates to improvements in baling machines primarily of the type adapted to bale hay, straw, and like material.

One of the objects of my invention is to provide a baling machine which will automatically deliver the material as it is gathered from the ground to the baling chamber in front of the baling plunger and as the material is delivered to the baling chamber, sever that portion of the material so delivered from the source of supply in order that the material, as it is fed forward by the plunger, will not drag or pull on the source of supply to leave ragged ends and the like in the bale.

Another object of my invention is to provide a precompression chamber into which the material is fed from the ground or other source of supply, which chamber will deliver the material into the baling chamber in advance of the baling plunger, and to provide means for severing the material of the precompression chamber from the material of the source of supply so that the material will be fed in front of the baling plunger in predetermined separated quantities.

For the purpose of disclosing the invention, I have illustrated an embodiment thereof in the accompanying drawings, in which:

Fig. 1 is a plan of a baling machine embodying my invention, or so much thereof as is necessary for the purpose of illustration;

Fig. 2 is a side elevation, partially in section;

Fig. 3 is a sectional view on the line 3, 3 of Fig. 2; and

Fig. 4 is a detail section showing the plunger for the precompression chamber.

In the embodiment of the invention illustrated, I provide, in a baling machine, a chassis 1 mounted on suitable transportation wheels 2, 2. At the forward end of this chassis, I provide a baling chamber comprising a series of parallel side bars 3, slightly tapering toward one another toward the forward end and vertically spaced to leave interstices 4 between the same.

This baling chamber is provided with a suitable top 5 and a suitable bottom to make a substantially rectangular chamber.

Operating within this baling chamber is a baling plunger 6 which is driven through the medium of a piston rod 7 connected at its rear end with crank wheels 8, 8 supported in suitable journals 9, 9 carried on the chassis 1. These crank wheels are driven from a suitable source of power, as, for instance, a gasoline engine or other power supplying means. Through the medium of the piston rod 7, the piston is reciprocated in the baling chamber and with each forward movement of the piston, a supply of hay or other material is fed in advance of the piston, so that on its forward movement, this material will be fed forward into the baling chamber and, due to the ensmallment of the forward end of the baling chamber, the material will be tightly compacted. In order to assist in this compacting of the material and to prevent the material from having a tendency to move backwards after having once been compressed, the side bars 3 are provided with inwardly and forwardly projecting spurs 10 on either side of the chamber and, likewise, the top and bottom may be provided with these spurs. These spurs are arranged beyond the forward limit of the movement of the plunger 6 so that they will not interfere with the movement of the plunger and, due to their forward inclination, while they permit the material to slide past the same, tend to prevent the material from working backwards.

The material to be baled is fed into the compression chamber through a suitable opening 38 in the side of the baling chamber, which opening is arranged at a point immediately forward of the plunger 6 when the plunger is at the limit of its retracted position. This opening communicates with a precompression chamber 11 extending at right angles to the baling chamber and including a side 12 and bottom 13 together with a sliding top 14. This sliding top 14 is adapted to reciprocate in a pair of guide rails 15 disposed on either side of the top. The receiving side of the precompression chamber is open, as indicated at 11' in Fig. 1, and this receiving side, in the present construction, faces the rear of the baling machine. As the material is fed into this receiving opening and into the precompression chamber 11, a compression head or plunger 16, which reciprocates in the precompression chamber, engages the same and forces it into the baling chamber in advance of the baling plunger. This compression head is pivoted on a shaft 17 extending transversely of the reciprocating top 14 and to this end, I provide a plurality of bell crank levers. One arm 18 of each of these levers is secured to the compressor 16 and the opposite arm 19 overlies the reciprocating top 14 so that as the reciprocating top 14 and with it the compressor 16 is moved toward the baling chamber, the compressor 16 will remain rigid, while, during the retracting movement, the compressor 16 may swing on the axis of the shaft 17 to clear any material which may have been fed into the precompressor chamber after the compressor has been moved to the limit of its innermost stroke.

In order to prevent the dragging of the material as it is deposited in advance of the baling plunger 6, I provide means for severing the material from the source of supply just before it enters the baling chamber. To this end, I mount, at the inner end of the precompressor chamber, or at the junction between the precompressor chamber and the baling chamber, a stationary sickle toothed knife 20 which may be bolted or otherwise secured to the frame of the precompressor chamber. Cooperating with this knife is a similar reciprocating cutting knife 21. These knives are arranged vertically at the junction between the precompression chamber and the baling chamber and, therefore, as the material is fed into the baling chamber from the precompression chamber, through the medium of the compressor 16, material projecting laterally through the opening in the side of the precompression chamber will be forced against the cutter knives 20 and 21, whereby the material in the precompression chamber will be severed from the source of supply.

For guiding the vertically reciprocating knife blade 21, I provide a slotted guide 22 which is located at the joint between the precompression chamber and the baling chamber. The top of this knife is connected by a link 23 with a crank 24 formed in a shaft 25. This crank shaft carries a sprocket wheel 26 which is driven by a chain drive 27 from a sprocket wheel 28 carried on one of the shafts 9. By this arrangement, the knife 21 is rapidly vertically reciprocated against the knife 20 and as the material is forced thereagainst by the compressor 16, the material in the precompression chamber 11 will be severed from the source of supply, permitting the material to be delivered into the baling chamber in advance of the plunger 6.

After a suitable quantity of material has been delivered to and compressed in the baling chamber, tying wires which have been wrapped around the bale during the baling process are tied by suitable tying mechanism 29 mounted on one side of the baling chamber, which tying mechanism is more fully described in my copending application filed July 31, 1941, Serial No. 404,880. The tying wires for the bale are fed across the baling chamber by suitable needles 30 which are likewise described more in detail in the above-entitled application. The compressor 16, together with the sliding top 14 is reciprocated through the medium of a driving mechanism in the form of a rack 31 which, by a link 32, is connected with a crank arm 33 on one of the shafts 9. This rack 31 drives a gear wheel 34 in turn mounted on a shaft 35 carrying, at its upper end, an oscillating crank arm 36, which crank arm is connected by a link 37 with the sliding cover 14.

I claim as my invention:

1. In a baling machine, the combination with a baling chamber and a reciprocating plunger operating therein, of a precompression chamber extending substantially transversely to the baling chamber and delivering into the side of said baling chamber, a reciprocating plunger operating in said precompression chamber and forcing the material to be baled into the receiving portion of the baling chamber in advance of the baling plunger, a vertically disposed knife adjacent the receiving portion of said baling chamber and having its blade lying in a plane intersected by the line of movement of said baling plunger and having its edge facing the material being moved by said precompression plunger, whereby said precompression plunger in moving the material into the baling chamber will force the same against the edge of said knife for severing said material from the source of supply.

2. In a baling machine, the combination with a baling chamber and a reciprocating plunger operating therein, of a precompression chamber extending substantially transversely with the baling chamber and delivering into the side of said baling chamber, said precompression chamber having an inlet opening in the side thereof, a reciprocating knife adjacent said opening and toward the baling chamber, and a reciprocating plunger operating in said precompression chamber and forcing the material to be baled against said knife for severance from the source of supply and into the baling chamber.

3. In a baling machine, the combination with a baling chamber and a reciprocating plunger operating therein, of a precompression chamber extending substantially transversely of the baling chamber and delivering into the side of said baling chamber, said precompression chamber having a receiving opening in the side wall thereof, a vertically reciprocating toothed edge knife adjacent said opening, and a reciprocating plunger operating in said precompression chamber and forcing the material to be baled against the knife to sever the same from the source of supply and into said baling chamber.

4. In a baling machine, the combination with a baling chamber and a reciprocating plunger operating therein, of a precompression chamber extending substantially transversely of the baling chamber and delivering into the side of said baling chamber, said precompression chamber having a material receiving opening in a side wall thereof, a relatively stationary toothed knife adjacent said opening, and a reciprocating toothed knife cooperating therewith, and a reciprocating plunger operating in said precompression chamber to force the material against said knives for severance from the source of supply and into said baling chamber.

5. In a baling machine, in combination, a horizontally disposed baling chamber having a reciprocating plunger operating therein and having a receiving opening in a vertical side wall thereof in advance of the baling plunger when the same is in its retracted position, a transversely extending precompression chamber communicating with said baling chamber and having an intake opening in a vertical side wall thereof, a vertically disposed knife located in the path of material moving through, and projecting from, said precompression chamber, said knife being disposed in advance of said opening in said baling chamber, and means for forcing the material delivered into said precompression chamber against said knife to sever the material from its source of supply and deliver said severed material into said baling chamber in advance of said baling plunger.

6. In a baling machine, in combination, a horizontally disposed baling chamber having a reciprocating plunger operating therein and having a receiving opening in a vertical side wall thereof in advance of the plunger when the same is in its retracted position, a horizontally disposed transversely extending precompression chamber communicating with said baling chamber and having an intake opening in a vertical side wall thereof, a reciprocating pusher operating in said precompression chamber and swingable into a position on its projecting stroke to force the material of said precompression chamber into said baling chamber and swingable on its return stroke to clear such material as may have been delivered into the precompression chamber behind said pusher, and means for severing the material in said precompression chamber from its source of supply, upon a plane transverse to the line of movement of said baling plunger, after such material has been delivered to said precompression chamber and prior to its delivery to said baling chamber in advance of said baling plunger.

7. In a baling machine, in combination, a horizontally disposed baling chamber having a reciprocating plunger operating therein and having a receiving opening in a vertical side wall thereof in advance of the plunger when the same is in its retracted position, a transversely extending precompression chamber communicating with said baling chamber and having an intake opening in a vertical side wall thereof, a pusher for forcing the material received in said precompression chamber into said baling chamber, and means operable upon the material in said precompression chamber to sever such material from its source of supply, substantially upon a plane intersected by the line of movement of said baling plunger, prior to the delivery of such material to said baling chamber in advance of said baling plunger.

8. In a baling machine, the combination with a baling chamber and a baling plunger horizontally reciprocable therein, of a precompression chamber extending substantially transversely of the baling chamber and having an intake opening in its vertical side wall, said precompression chamber delivering through its own end into an opening in a vertical side wall of said baling chamber, a horizontally reciprocating plunger operating in said precompression chamber and forcing the material to be baled from said precompression chamber into the receiving portion of said baling chamber in advance of said baling plunger, and a vertically disposed means located outside said baling chamber adjacent said end of said precompression chamber against which the material is forced by the movement of the precompression plunger for severing the material to be delivered to the baling chamber from the source of supply.

9. In a baling machine, the combination with a baling chamber disposed in a substantially horizontal position and a reciprocating plunger operating therein, said chamber having an opening in the side wall thereof, a transversely disposed material-receiving chamber terminating at said opening and having a horizontally disposed bottom substantially in the same plane as the bottom of said baling chamber and having one side and its top open, a sliding cover member for the top of said receiving chamber, a pusher swingably supported on said cover member at the rear thereof and operating in said receiving chamber to force the material fed into the said receiving chamber into said baling chamber and swingable on its return stroke to clear the material fed into said receiving chamber after the projected stroke of said pusher, said sliding cover member closing the top of the receiving chamber in advance of said pusher member during its projected stroke.

10. In a baling machine, the combination with a baling chamber disposed in substantially horizontal position and a reciprocating plunger operating therein, said chamber having an opening in a side wall thereof, of a transversely disposed material-receiving chamber terminating at said opening and having a horizontally disposed bottom substantially in the same plane as the bottom of said baling chamber and having one vertical side open, a reciprocating pusher reciprocating in said receiving chamber and swingable into a position to engage the material in said receiving chamber and force the same from said chamber through the opening in said baling chamber in advance of said baling plunger and swingable on its retractile stroke to clear the material fed into the receiving chamber after the projected stroke of said pusher, and means for severing the material in said receiving chamber from the source of supply prior to its delivery by said pusher into the baling chamber.

11. In a baling machine, the combination with a baling chamber disposed in a substantially horizontal position and a reciprocating plunger operating therein, said chamber having an opening in the side wall thereof, a transversely disposed material-receiving chamber terminating at said opening and having a horizontally disposed bottom substantially in the same plane as the bottom of said baling chamber and having one vertical side and its top open, a reciprocating pusher reciprocating in said receiving chamber and swingable into a position to engage the material in said chamber and force the same from said chamber through the opening in said baling chamber in advance of said baling plunger and swingable into a position to clear the material fed into said receiving chamber after the projected stroke of said pusher, means for severing the material from the source of supply prior to its delivery into the baling chamber, and means for closing the top of said receiving chamber in advance of said pusher.

JESSE A. HAASE.